United States Patent [19]
Nield

[11] Patent Number: 5,636,726
[45] Date of Patent: Jun. 10, 1997

[54] METHOD AND APPARATUS FOR TRANSFERRING EGGS

[75] Inventor: James M. Nield, Northville, Mich.

[73] Assignee: Diamond Automations, Inc., Farmington Hills, Mich.

[21] Appl. No.: 372,426

[22] Filed: Jan. 13, 1995

[51] Int. Cl.$^6$ ............................................. B65G 47/26
[52] U.S. Cl. .......................... 198/430; 198/432; 198/468.4
[58] Field of Search ........................ 198/436, 438, 198/445, 456, 468.4, 427, 428, 430, 432, 433

[56] References Cited

U.S. PATENT DOCUMENTS

| | | |
|---|---|---|
| 2,803,485 | 5/1957 | Page et al. . |
| 3,225,891 | 12/1965 | Hickin et al. ................. 198/438 X |
| 3,272,360 | 9/1966 | van der Schoot . |
| 3,360,102 | 12/1967 | Cummings . |
| 3,388,815 | 6/1968 | Lingl ............................. 198/436 X |
| 3,415,388 | 12/1968 | Hörnlein et al. . |
| 3,437,096 | 4/1969 | Warren . |
| 3,542,224 | 11/1970 | Warren . |
| 3,587,888 | 6/1971 | Warren . |
| 3,805,943 | 4/1974 | Warren . |
| 3,884,364 | 5/1975 | Mercier et al. . |
| 3,991,885 | 11/1976 | Warren .......................... 198/468.4 X |
| 4,045,073 | 8/1977 | Mosterd . |
| 4,079,845 | 3/1978 | Warren . |
| 4,283,245 | 8/1981 | Benoit .............................. 198/436 X |
| 4,343,391 | 8/1982 | Skrypek et al. ...................... 198/438 |
| 4,355,936 | 10/1982 | Thomas et al. . |
| 4,383,613 | 5/1983 | van Kettenbroek . |
| 4,396,109 | 8/1983 | Nambu . |
| 4,569,444 | 2/1986 | McEvoy et al. . |

FOREIGN PATENT DOCUMENTS 1177942  1/1970  United Kingdom ............... 198/468.4

*Primary Examiner*—D. Glenn Dayoan
*Attorney, Agent, or Firm*—Kenyon & Kenyon

[57] ABSTRACT

A method and apparatus are disclosed for increasing the speed of removal of eggs from an egg-tray conveyor and unloading of the eggs onto a roller conveyor. The invention includes two or more loader head pairs, which can operate either alternatively or in tandem between the egg-tray conveyor and the roller conveyor. The loader head pairs can also be indexed. The invention allows for an increase in speed of an egg-grading machine without an increase in risk that the eggs to be graded will be damaged during removal and unloading.

27 Claims, 6 Drawing Sheets

5,636,726

METHOD AND APPARATUS FOR TRANSFERRING EGGS

BACKGROUND OF THE INVENTION

1. Field of the Invention

The present invention relates to a method and apparatus for transferring eggs from an egg-tray conveyor to a roller conveyor, preferably a roller conveyor oriented perpendicular to the direction of the egg-tray conveyor. The invention uses a plurality of egg-transfer mechanisms, each mechanism including a loader arm and one or more loader heads. The egg-transfer mechanisms can alternate or can operate in tandem. The present invention allows egg to be transferred from the egg tray conveyor to the roller conveyor at speeds that are greatly increased over prior art egg-transfer mechanisms, without increasing the risk that eggs will be damaged during transfer.

2. Description of the Related Art

Prior art large-scale egg-grading machines generally contain stations for washing, candling, weighing and/or sorting eggs. An example of such a machine is shown in U.S. Pat. No. 4,569,444. The eggs in such a prior art egg-grading machine are initially conveyed by a roller conveyor to the various stations in the egg-grading machine.

The eggs which are processed by the above-described prior art egg-grading machine are generally brought to the egg-grading machine in stacked trays containing, e.g., 30 eggs per tray. The trays are initially conveyed to the egg-grading machine as a stack of trays, either in boxes or after removal of the stack from boxes. The stacks of trays are then unstacked by a unstacking machine, such as the machine shown in U.S. Pat. No. 4,355,936. This type of machine unstacks the stacks of trays, and places individual trays on a conveyor. The conveyor then conveys the trays in one or more rows to a transfer station. At the transfer station, a transfer mechanism removes the eggs from the egg trays and transfers the eggs to the roller conveyor of the egg-grading machine.

U.S. Pat. No. 3,587,888 shows a prior art mechanism for transferring from an egg-tray conveyor to a roller conveyor of an egg-grading machine. In this type of device, the transfer mechanism uses two or more loader heads with vacuum grippers which grasp the eggs on the egg trays from above and transfer the eggs in groups to the roller conveyor. The roller conveyor is generally perpendicular to the egg-tray conveyor. This type of prior art transfer mechanism uses a single loader arm with two or more loader heads, each loader head containing an array of vacuum grippers to thereby remove eggs from two or more trays simultaneously. The loader head swings away from the egg-tray conveyor after gripping the eggs in the egg trays, and then deposits the gripped eggs onto the roller conveyor. Such an arrangement has inherent speed limitations, as the single loader arm can only be operated at a certain optimal speed before there is a risk of damaging eggs during transfer. As a result, the total speed of the egg-grading system can be limited by the speed at which the transfer mechanism can be optimally operated.

SUMMARY OF THE INVENTION

The present invention uses two transfer mechanisms— having either alternate operation or operating in tandem—to unload eggs from egg trays on an egg-tray conveyor operating on both sides of the egg-tray conveyor. Two transfer mechanisms can be used to unload eggs from a single-row egg-tray conveyor or a multiple-row egg-tray conveyor. The transfer mechanisms, in certain conveyor configurations, can operate in tandem—i.e., with both transfer mechanisms removing eggs from the egg-tray conveyor at the same time and loading eggs onto the roller conveyor at the same time. Alternate operation is also possible in all conveyor configurations—i.e., one transfer mechanism loads eggs onto the roller conveyor while the other transfer mechanism removes eggs from the egg-tray conveyor. In addition, the loader heads can shift laterally between an egg-removal position and an egg-loading position, to thereby index the egg-removal and egg-unloading positions of the loader heads. Each of these options can be adapted to the particular size of the egg-tray conveyor being used and the size of the roller conveyor being used, as well as the particular transfer speed desired. In addition, the particular unloading sequence option can be adapted to the space limitations of the particular application. The transfer mechanism and method of the present invention greatly increases the speed at which an egg-grading mechanism can be operated without risking damage to the eggs.

DETAILED DESCRIPTION OF THE INVENTION

Figure 1:
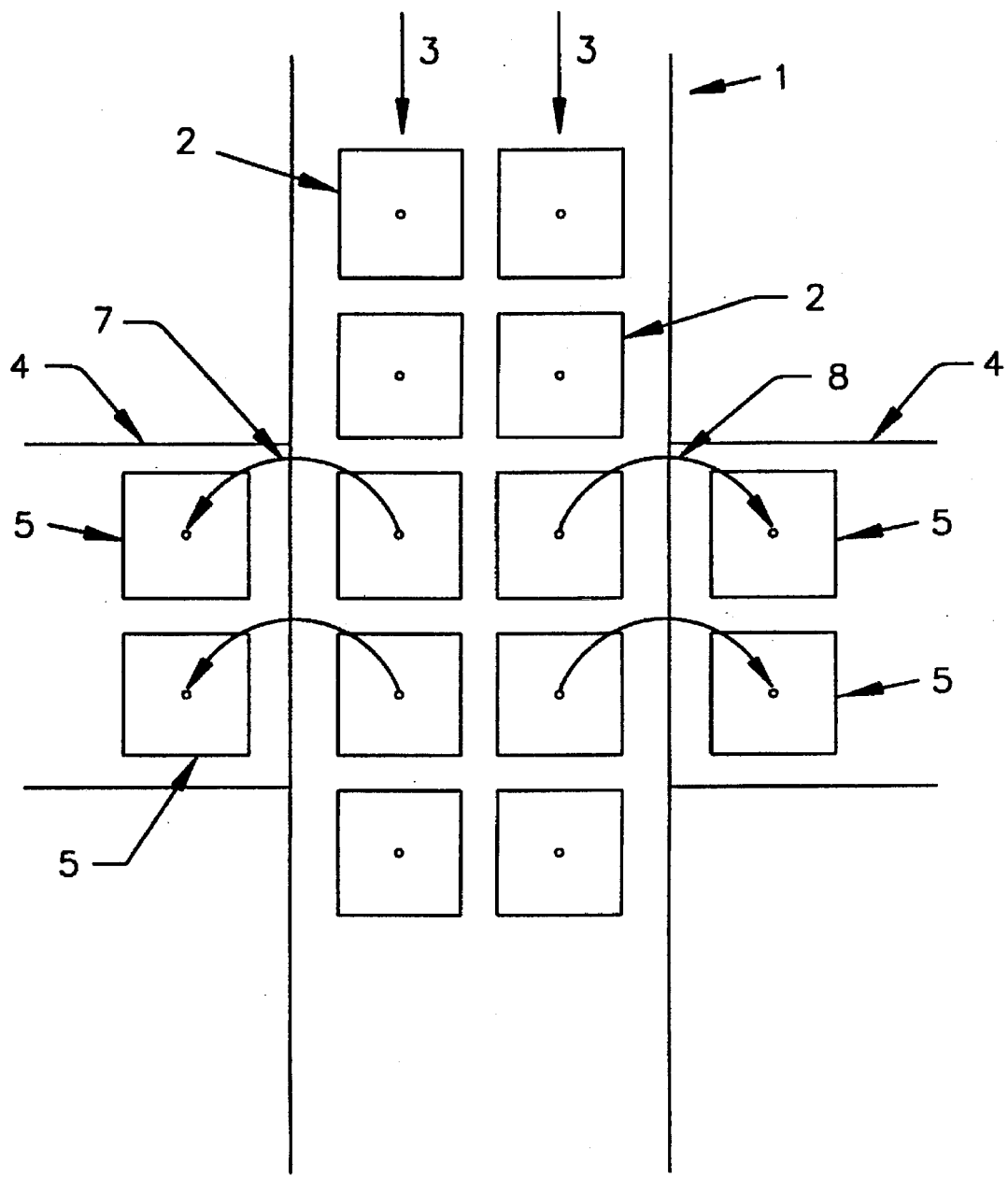
FIG. 1 shows an upper schematic view of the conveyor unloading sequence of a first embodiment of the present invention.

FIG. 1 shows a top schematic view of an transfer sequence of a first embodiment of the present invention. An egg-tray conveyor 1 carries a series of egg trays 2 in a first direction, indicated by arrows 3. Although arrows 3 are shown in the same direction in FIG. 1, the conveyor 1 can operate such that each egg tray 2 row approaches the roller conveyor 4 from a direction opposite the other row. Egg-tray conveyor 1 can be of any conventional type, e.g., a continuous-belt conveyor, and is configured to index egg trays in a sequence which allows the transfer mechanism to remove eggs from the egg trays 2 as described below. In the schematic of FIG. 1, the egg trays 2 are conveyed in a double-row configuration, i.e., in two rows of egg trays 2 advancing along the length of egg-tray conveyor 1. More than two rows of egg trays can be conveyed on egg-tray conveyor 1. Situated perpendicular to, and below, egg-tray conveyor 1 is a roller conveyor 4. Roller conveyor 4 can be of any conventional type used in conveying individual eggs in one or more rows, e.g., the roller conveyor shown in U.S. Pat. No. 4,569,444. As shown in FIG. 1, eggs are deposited on roller conveyor 4 in egg groups 5, which egg groups 5 correspond to a group of eggs unloaded by one of the loader heads 6 mounted on a loader arm 12. Arrows 7 indicate the direction of movement of the loader heads 6 of a first loader head mechanism 9 and arrows 8 indicate the direction of movement of the loader heads 6 of a second loader head mechanism 10. Thus, as shown in FIG. 1, first mechanism 9 removes eggs from a left-hand row of egg trays, while second mechanism 10 removes eggs from a right-hand row of egg trays 6. FIG. 1 shows the mechanisms 9, 10 operating in tandem, i.e., with both loader head 6 pairs removing eggs from the egg-tray conveyor 1 at the same time and loading eggs onto the roller conveyor at the same time. However, the embodiment of FIGS. 1 and 2 also could alternate, i.e., one loader head 6 pair loads eggs onto the roller conveyor 4 while the other loader head 6 pair removes eggs from the egg-tray conveyor 1.

Figure 2:
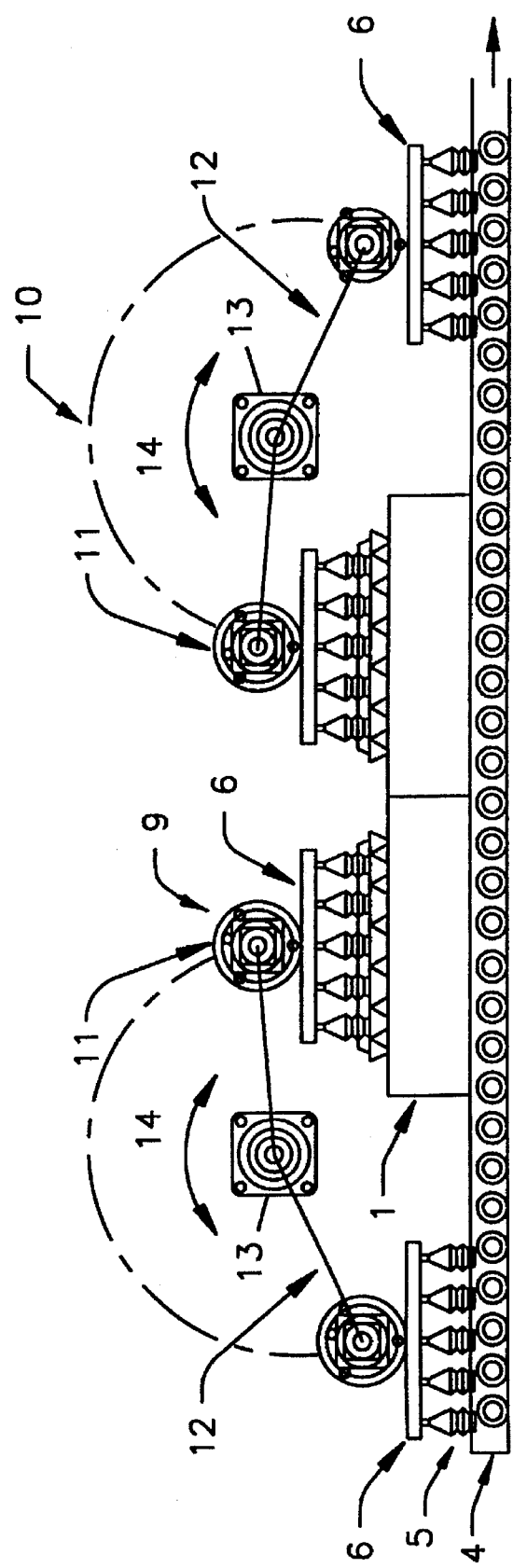
FIG. 2 shows a side view of the embodiment of FIG. 1.

FIG. 2 shows a detail side view of the embodiment of FIG. 1. Each of the mechanisms 9, 10 include a pair of loader heads 6 pivotally or rotatably attached, via a head joint 11, to a loader arm 12. FIG. 2 represents the two positions of the mechanisms 9, 10—a first removal position where the loader heads 6 are situated above egg-tray conveyor 1 and a second loading position where the loader heads are situated above roller conveyor 4. The loader heads 6 are both mounted side-by-side on an end of the loader arm 12. Loader arms 12 are rotatably mounted to an arm pivot 13, which is coupled to an loader arm rotating mechanism. Loader arm 12 rotates about arm pivot 13 in the directions indicated by arrow 14.

In operation of the embodiment of FIGS. 1 and 2, egg trays 2 are conveyed in direction 3 by egg-tray conveyor 1. Loader heads 6 swing into position, upon rotation of loader arms 12 about arm pivots 13, until the loader heads 6 are above the egg trays 2 which are adjacent roller conveyor 4. Vacuum is applied to the grippers of the loader heads 6, and the eggs in the egg trays 2 are thereby gripped by the loader heads 6. Loader arms 12 are then pivoted about arm pivot 13 until the loader heads 6 are directly above roller conveyor 4. Vacuum is released from the loader heads 6, thereby loading the eggs onto roller conveyor 4 in egg groups 5. Eggs are thereafter conveyed by roller conveyor 4 to any known egg-grading equipment. The use of two mechanisms operating either in tandem or alternating increases the number of eggs which can be transferred between the conveyors 1 and 2 in a given period of time, thereby allowing higher conveyor speeds for conveyors 1 and 2, and thereby greatly increasing overall egg grading speed. The embodiment of FIGS. 1 and 2 can be operated such that both of the loader head 6 pairs operate in tandem to remove eggs from the egg trays 2 at the same time. The embodiment of FIGS. 1 and 2 can also alternate such that one loader head 6 pair is removing eggs from the eggs trays 2 at the same time the other loader head 6 pair is loading eggs onto the roller conveyor 4.

Figure 3:
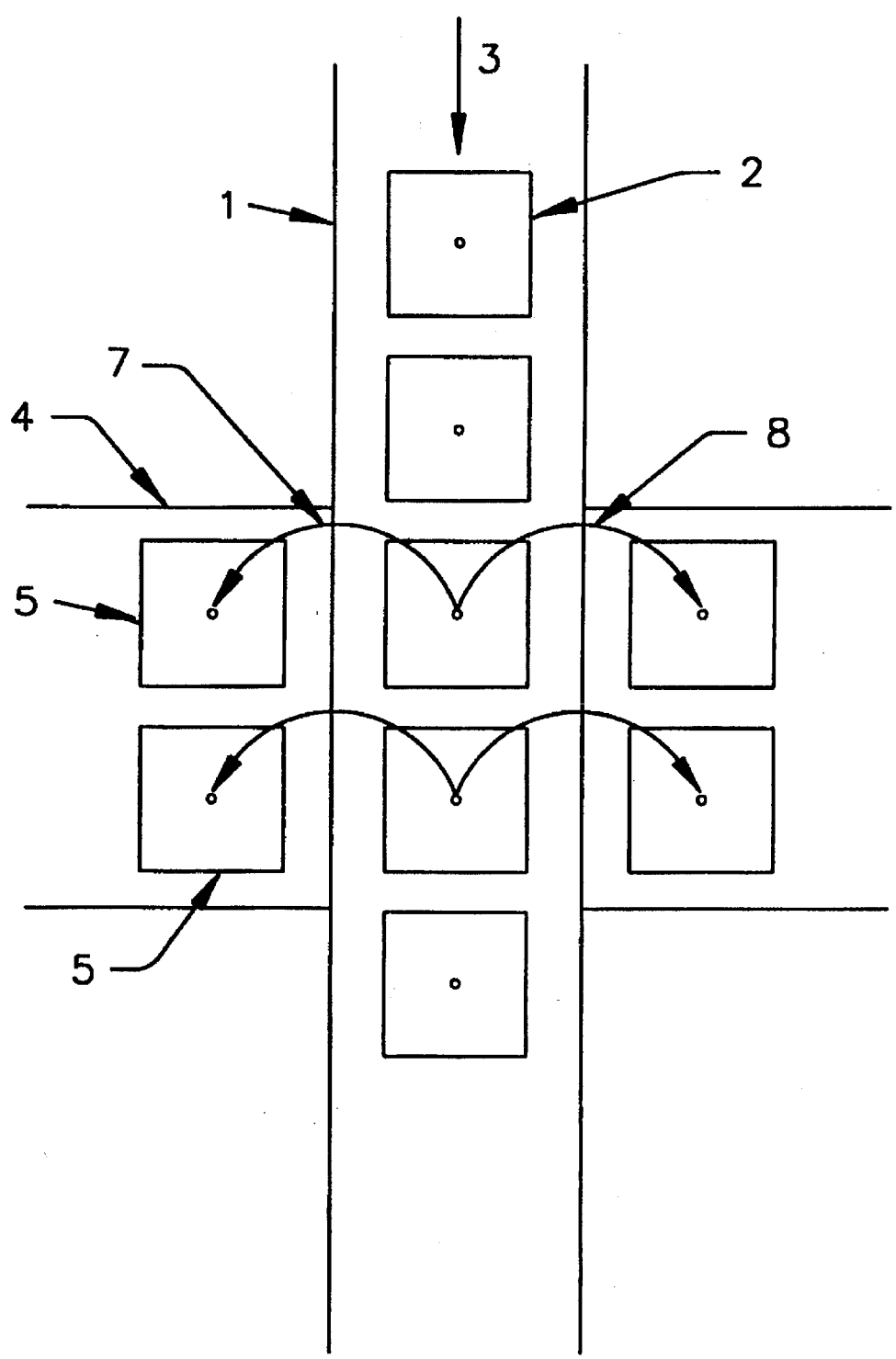
FIG. 3 shows an upper schematic view of the conveyor unloading sequence of a second embodiment of the present invention.
Figure 4:
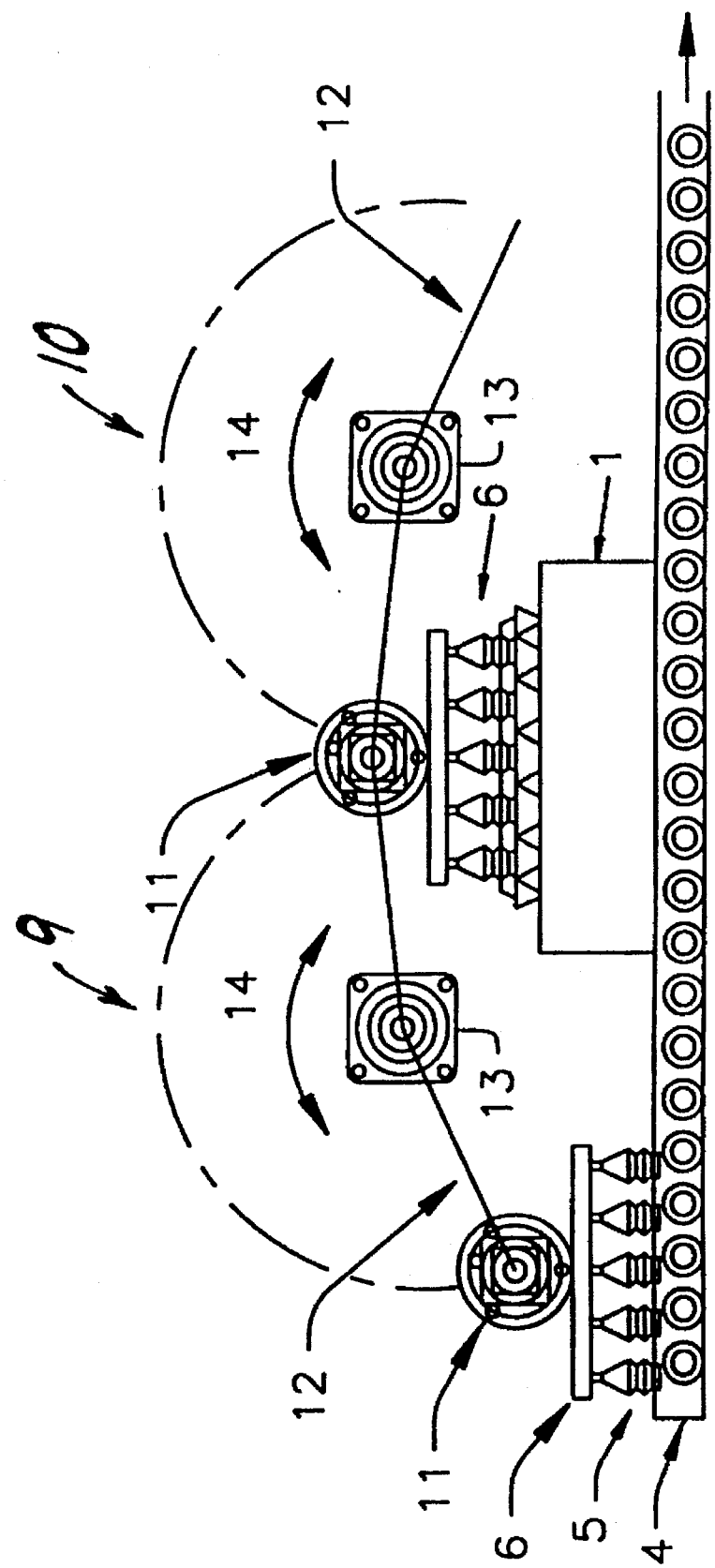
FIG. 4 shows a side view of the embodiment of FIG. 3

FIGS. 3 and 4 show a second embodiment of the present invention, in which the egg trays on egg-tray conveyor are conveyed in a single-row configuration, i.e., with one row of egg trays 2 on egg-tray conveyor 1. In the embodiment of FIGS. 3 and 4, the mechanisms 9 and 10 must alternate, i.e., one loader head 6 pair must load eggs onto the roller conveyor 4 while the other loader head 6 pair removes eggs from the egg-tray conveyor 1. This operation is necessary because both loader head 6 pairs remove eggs from the egg trays 2 at the same position on the egg-tray conveyor 1. In all other respects, however, the embodiment of FIGS. 3 and 4 operates identically to the embodiment of FIGS. 1 and 2.

Figure 5:
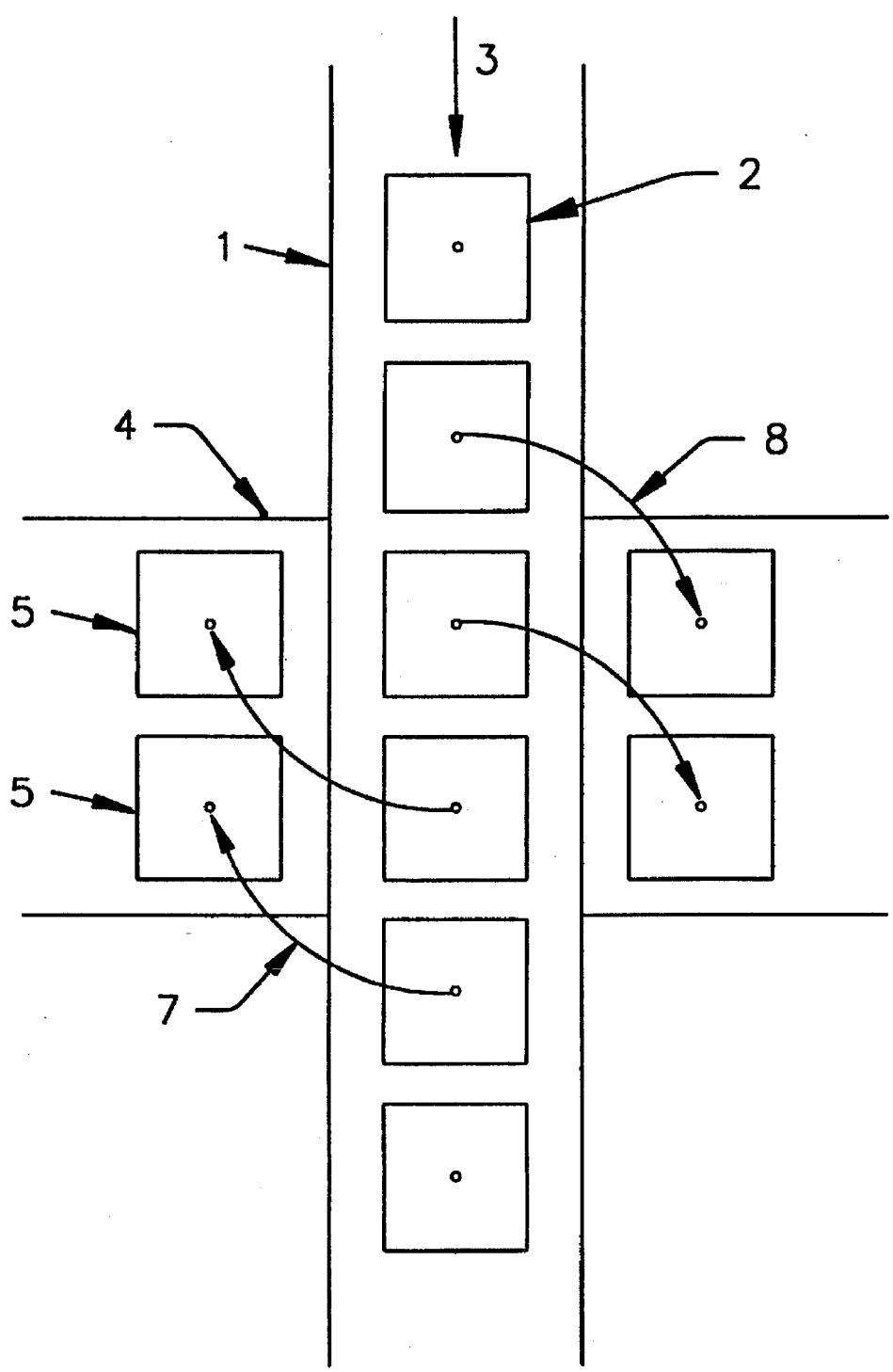
FIG. 5 shows an upper schematic view of the conveyor unloading sequence of a third embodiment of the present invention.
Figure 6:
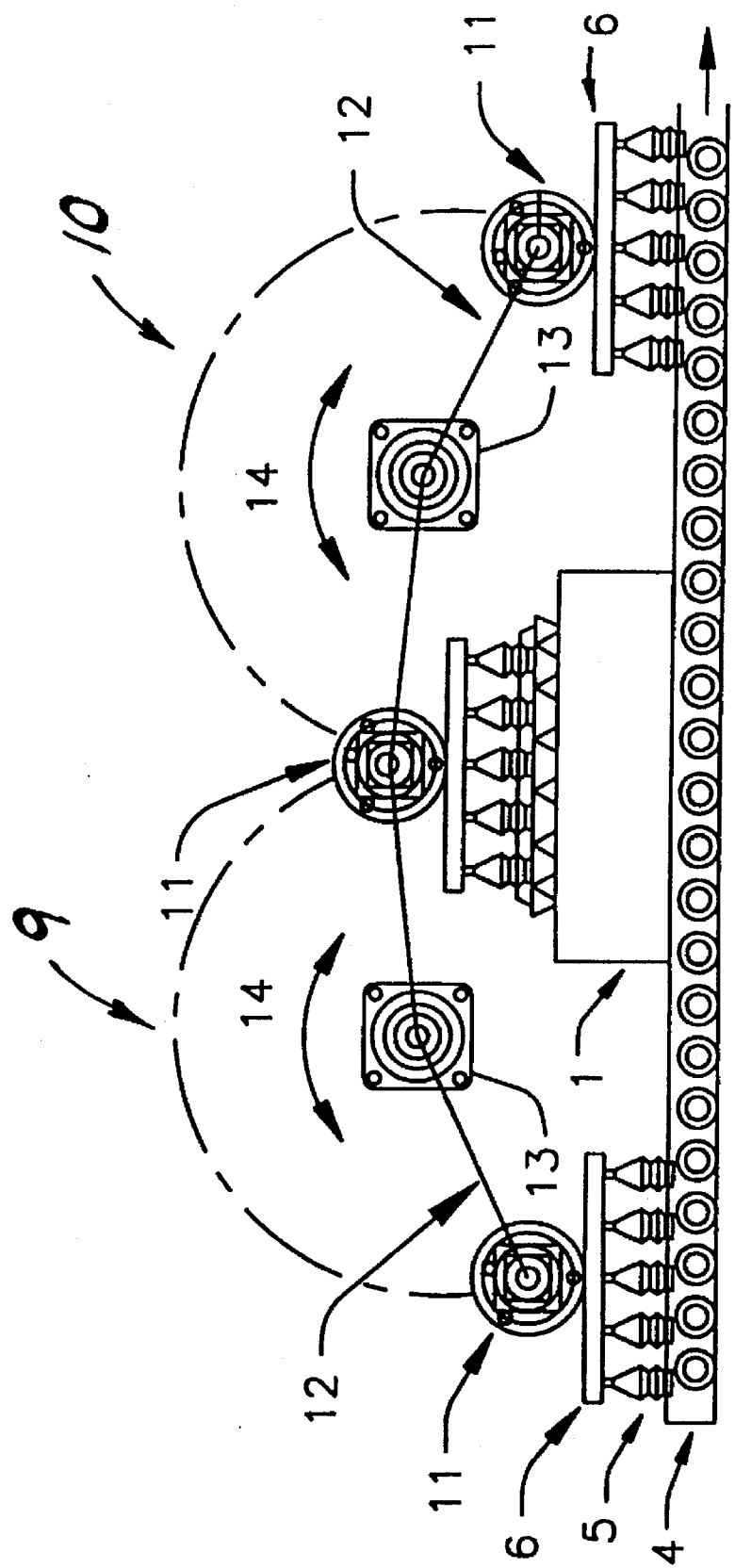
FIG. 6 shows a side view of the embodiment of FIG. 5.

FIGS. 5 and 6 show a third embodiment of the present invention, which is similar to the embodiment of FIGS. 3 and 4, but which indexes the removal and loading positions of the loader head 6 pairs. As a result, the embodiment of FIGS. 5 and 6, unlike the embodiment of FIGS. 3 and 4, can alternate or operate in tandem, since the egg-removal positions for the loader head 6 pairs are different. As can be seen in FIG. 5, the loader head pairs 6 shift laterally, i.e., along the length of egg-tray conveyor 1, between the egg-removal and the egg loading positions, to thereby index egg removal and egg unloading. This indexing can be accomplished by using a pivot shaft in either arm pivot 13 or head joint 11 which reciprocates inwardly and outwardly between the egg-removal and the egg-loading positions.

It is to be understood that many variations are possible under the teachings of the present disclosure, in both the removal and unloading patterns and the number of elements which are used to accomplish these patterns. In addition, although the preferred embodiment transfers eggs in egg trays from a first conveyor, the first conveyor could convey eggs without egg trays, and can be any form of conveyor for transferring eggs, including a conveyor which conveys eggs in cups. The present invention is not limited by the particular structures and methods described above, but is instead defined by the claims below.

I claim:

1. An apparatus for conveying eggs comprising:
   a first conveyor conveying eggs;
   a single second conveyor conveying individual eggs;
   a transfer mechanism, said transfer mechanism transferring eggs from said first conveyor to said second conveyor, said transfer mechanism comprising a first transfer mechanism and a second transfer mechanism, said first and second transfer mechanisms each comprising grippers for gripping eggs on said first conveyor and releasing eggs onto said second conveyor, said first and second transfer mechanisms being located on opposite sides of said first conveyor to thereby release eggs on said second conveyor on opposite sides of said first conveyor.

2. The apparatus of claim 1, wherein:
   said first and second transfer mechanisms comprise rotating loader arms.

3. The apparatus of claim 2, wherein:
   said loader arms of said first and second transfer mechanisms alternate.

4. The apparatus of claim 2, wherein:
   said loader arms of said first and second transfer mechanisms operate in tandem.

5. The apparatus of claim 1, wherein:
   at least one of said first and second mechanisms indexes along the length of said first conveyor.

6. The apparatus of claim 5, wherein:
   both of said first and second mechanisms index along the length of said first conveyor.

7. The apparatus of claim 2, wherein:
   said first and second transfer mechanisms comprise a pair of loader heads, said grippers comprising vacuum grippers.

8. The apparatus of claim 1, wherein:
   said first conveyor conveys two rows of egg trays.

9. The apparatus of claim 8, wherein:
   said two rows are conveyed in opposite directions.

10. The apparatus of claim 8, wherein: said two rows are conveyed in a same direction.

11. The apparatus of claim 1, wherein:
    said first conveyor and said second conveyor are perpendicular to one another.

12. The apparatus of claim 1, wherein:
    said second conveyor is a roller conveyor.

13. The apparatus of claim 1, wherein: said first conveyor is an indexing conveyor.

14. A method of conveying eggs comprising the steps of:

conveying eggs on a first conveyor;

transferring eggs from said first conveyor to a single second conveyor, said step of transferring eggs comprising the steps of gripping eggs on said first conveyor and releasing eggs onto said second conveyor, said step of transferring further comprising releasing eggs onto said second conveyor on opposite sides of said first conveyor; and individually conveying said eggs on said second conveyor.

15. The method of claim 14, wherein:

said step of transferring comprises rotating plural transfer mechanisms to thereby transfer eggs from said first conveyor to said second conveyor.

16. The method of claim 15, wherein:

said transfer mechanisms alternate.

17. The method of claim 15, wherein:

said transfer mechanisms operate in tandem.

18. The method of claim 15, wherein:

at least one of said transfer mechanisms indexes along a length of said first conveyor.

19. The method of claim 18, wherein:

both of said transfer mechanisms index along the length of said first conveyor.

20. The method of claim 14, wherein:

said step of gripping comprises applying a vacuum to said eggs and said step of releasing comprises releasing said vacuum from said eggs.

21. The method of claim 14, wherein:

said step of conveying eggs on a first conveyor comprises conveying two rows of egg trays.

22. The method of claim 21, wherein:

said step of conveying eggs on a first conveyor comprises conveying said two rows in opposite directions.

23. The method of claim 21, wherein:

said step of conveying eggs on a first conveyor comprises conveying said two rows in a same direction.

24. The method of claim 14, wherein:

said step of individually conveying said eggs on said second conveyor comprises the step of individually conveying said eggs in a direction perpendicular to a direction of said first conveyor.

25. The method of claim 14, wherein:

said step of individually conveying said eggs on said second conveyor comprises the step of conveying said eggs on a roller conveyor.

26. The method of claim 14, wherein:

said step of conveying eggs on a first conveyor comprises indexing said first conveyor.

27. The method of claim 14, wherein:

said step of conveying eggs on a first conveyor comprises conveying eggs on egg trays; and wherein said step of transferring eggs comprises lifting groups of eggs from said egg trays and depositing said groups of eggs on said second conveyor.

\* \* \* \* \*